United States Patent
Chang et al.

(10) Patent No.: US 10,290,268 B2
(45) Date of Patent: May 14, 2019

(54) POWER OFF INDICATING APPARATUS AND POWER OFF INDICATING METHOD THEREOF

(71) Applicant: E Ink Holdings Inc., Hsinchu (TW)

(72) Inventors: Yu-Kai Chang, Hsinchu (TW); Yu-Hsun Kuo, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 16/027,397

(22) Filed: Jul. 5, 2018

(65) Prior Publication Data

US 2019/0073965 A1 Mar. 7, 2019

(30) Foreign Application Priority Data

Sep. 1, 2017 (TW) .............................. 106129865 A

(51) Int. Cl.
| | |
|---|---|
| G09G 3/34 | (2006.01) |
| G06K 7/10 | (2006.01) |
| G02F 1/167 | (2006.01) |

(52) U.S. Cl.
CPC ......... G09G 3/344 (2013.01); G06K 7/10297 (2013.01); G06K 7/10366 (2013.01); *G02F 1/167* (2013.01); *G06K 7/10336* (2013.01); *G09G 2330/02* (2013.01)

(58) Field of Classification Search
CPC .... G06K 7/10366; G06K 7/00; G06K 7/0008; G06K 7/0095; G06K 7/08; G06K 7/081; G06K 7/082; G06K 7/083; G06K 7/089; G06K 7/10; G06K 7/10009; G06K 7/10316; G06K 7/10336; G06K 7/10297; G06K 3/344; H02J 7/025; G09G 2330/12; G09G 2330/028; G09G 2330/027; G09G 2330/023; G09G 2330/00; G09G 3/3433; G09G 2330/02; G09G 3/344

See application file for complete search history.

(56) References Cited

U.S. PATENT DOCUMENTS

| | | | |
|---|---|---|---|
| 6,151,016 A | * | 11/2000 | Kanbe ................. G09G 3/3648 345/204 |
| 6,628,205 B2 | | 9/2003 | Aguren et al. |
| 6,661,564 B2 | | 12/2003 | Tsujimura et al. |
| 7,424,266 B2 | | 9/2008 | Ootaka et al. |
| 7,805,618 B2 | | 9/2010 | Covi et al. |
| 2003/0020999 A1 | * | 1/2003 | Tsujimura ............. G06F 1/1616 359/245 |
| 2011/0134097 A1 | * | 6/2011 | Sugamata ............. G06F 1/3203 345/211 |
| 2014/0085269 A1 | | 3/2014 | Armstrong-Muntner |
| 2018/0341942 A1 | * | 11/2018 | DeBates ............. G06Q 20/3278 |

FOREIGN PATENT DOCUMENTS

| | | | |
|---|---|---|---|
| CN | 103576587 | | 2/2014 |
| GB | 2527097 A | * | 12/2015 ............ G06F 11/321 |
| JP | 2010049454 | | 3/2010 |
| TW | M396778 | | 1/2011 |
| TW | 201710120 | | 3/2017 |

* cited by examiner

*Primary Examiner* — Julie Anne Watko
(74) *Attorney, Agent, or Firm* — JCIPRNET

(57) ABSTRACT

A power off indicating apparatus and a power off indicating method thereof are provided. A power off detecting circuit provides a storage voltage to an electrophoretic display when a power is off, so as to control the electrophoretic display to display a power off information. A tag reader resets a display status of the electrophoretic display according to an electronic tag read by the tag reader.

10 Claims, 2 Drawing Sheets

POWER OFF INDICATING APPARATUS AND POWER OFF INDICATING METHOD THEREOF

CROSS-REFERENCE TO RELATED APPLICATION

This application claims the priority benefit of Taiwan application serial no. 106129865, filed on Sep. 1, 2017. The entirety of the above-mentioned patent application is hereby incorporated by reference herein and made a part of this specification.

BACKGROUND OF THE INVENTION

Field of the Invention

The invention is related to an indicating apparatus, and particularly to a power off indicating apparatus and a power off indicating method thereof.

Description of Related Art

Generally speaking, an electronic device is provided with a status indicating device exposed from a housing so as for user to see the operation status of an electronic device. For example, a power off indicator in a security system or a food refrigeration device may employ an indicating light or a liquid crystal screen to indicate whether power supply is normal, for example, whether power was off, so as to ensure that the user's home safety or quality of food is good. Generally speaking, a status indicating apparatus is required to supply additional power (e.g., battery) continuously so as to ensure normal display, however, which causes continuing power consumption.

SUMMARY OF THE INVENTION

The invention provides a power off indicating apparatus and a power off indicating method, which is capable off effectively indicating whether power was off without supplying power to the power off indicating apparatus continuously.

In the invention, the power off indicating apparatus includes an electrophoretic display, a power detecting circuit and a tag reader. The power off detecting circuit is coupled to the electrophoretic display, and the power off detecting circuit detects power as well as provides a storage voltage to the electrophoretic display when the power is off so as to control the electrophoretic display to display power off information. The tag reader is coupled to the electrophoretic display, and the tag reader may read an electronic tag so as to reset a display status of the electrophoretic display.

In an embodiment of the invention, the power off detecting circuit includes an electricity storage element and a switch circuit. A first end of the electricity storage element is coupled to power, and a second end of the electricity storage element is coupled to the ground. The switch circuit is coupled between the power and the electrophoretic display, which is in an off status when a power voltage supplied by the power is not lower than a threshold voltage and in an on status when the power voltage is lower than the threshold voltage, thereby supplying a storage voltage stored in the electricity storage element to the electrophoretic display.

In an embodiment of the invention, the switch circuit includes a dividing circuit and a switch. The dividing circuit is coupled to the power, thereby dividing the power voltage to supply a dividing voltage. The switch is coupled between the power and the electrophoretic display, and a control end of the switch receives the dividing voltage.

In an embodiment of the invention, the dividing circuit includes a first resistor and a second resistor. The second resistor and the first resistor are connected in series between the first end of the electricity storage element and the ground, and a common contact point of the first resistor and the second resistor is coupled to the power and the control end of the switch.

In an embodiment of the invention, the switch includes a p-type transistor.

In an embodiment of the invention, the power off detecting circuit includes a rectifying circuit which is coupled to the power, the switch circuit and the electricity storage element such that the current that flows through the rectifying circuit flows unidirectionally from the power to the electricity storage element.

In an embodiment of the invention, the electronic tag includes a near field communication tag, and the reader includes a near field communication reader.

The invention further provides a power off indicating method of a power off indicating apparatus. The power off indicating apparatus includes an electrophoretic display. The power off indicating method of the power off indicating apparatus includes the following steps: detecting power; determining whether power is off; supplying a storage voltage to the electrophoretic display when the power is off so as to control the electrophoretic display to display power off information; determining whether an electronic tag is read; and if the electronic tag is read, resetting a display status of the electrophoretic display.

In an embodiment of the invention, the electronic tag includes a near field communication tag, and the reader includes a near field communication reader.

In an embodiment of the invention, if the power is not off, the electricity storage element in the power off indicating apparatus is charged. The electricity storage element performs charging operation so as to supply a storage voltage.

In summary, the power off detecting circuit in the embodiment of the invention may provide the storage voltage to the electrophoretic display when the power is off so as to control the electrophoretic display to display power off information. Since the display content can be maintained without requiring the electrophoretic display to supply power continuously, it can be effectively indicated whether power was off, and the problem of continuing power supply does not exist. In addition, resetting the display status of the electrophoretic display according to the electronic tag read by the tag reader can increase convenience of utilization, and an encryption protection effect can be achieved.

In order to make the aforementioned features and advantages of the invention more comprehensible, embodiments accompanying figures are described in detail below.

DESCRIPTION OF EMBODIMENTS

Figure 1:
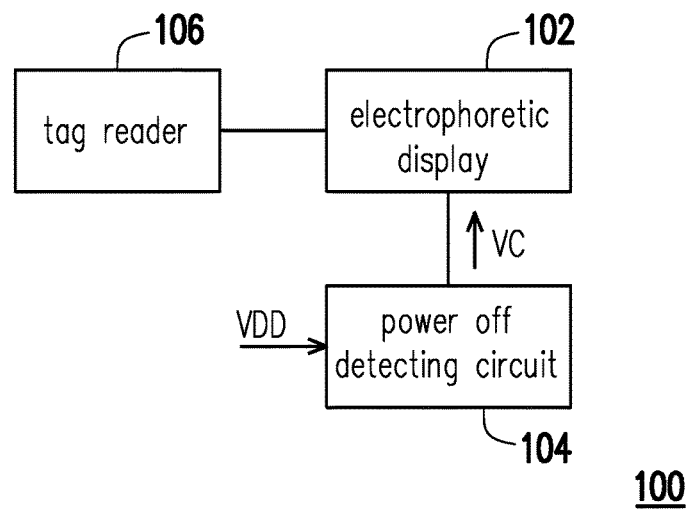
FIG. 1 is a schematic view of a power off indicating apparatus according to an embodiment of the invention.

FIG. 1 is a schematic view of a power off indicating apparatus according to an embodiment of the invention. Referring to FIG. 1, a power off indicating apparatus 100 includes an electrophoretic display 102, a power off detecting circuit 104 and a tag reader 106. The electrophoretic display 102 is coupled to the power off detecting circuit 104 and the tag reader 106. The electrophoretic display 102 may be used to display a power supply status of a power VDD monitored by the power off indicating apparatus 100. For example, if the power VDD has never been off, the electrophoretic display 102 displays a white image (which may also be regarded as that an image content is not displayed). When the power VDD is off, the electrophoretic display 102 may display a red image. It should be mentioned that the color or content displayed by the electrophoretic display 102 is not limited thereto. The power off detecting circuit 104 may detect the power supply status of the power VDD. When the power is off, the power off detecting circuit 104 may provide a storage voltage VC to the electrophoretic display 102 so as to control the electrophoretic display 102 to display power off information (e.g., the red image mentioned above). Since the electrophoretic display 102 is characterized in that it is not required for the electrophoretic display 102 to continuously supply power to pixel to maintain the display image, after the electrophoretic display 102 receives the storage voltage VC to change the display image, the changed display image can be maintained continuously so there is no need to receive voltage continuously. Therefore, the power off indicating apparatus 100 can effectively indicate whether the power VDD was off, and the problem of requiring additional power for continuing power supply does not exist. In addition, using the electrophoretic display 102 to display power off information not only reduces power consumption, but also lowers the manufacturing cost of the power off indicating apparatus 100.

Additionally, to avoid the problem that the user needs to disassemble the electrophoretic display 102 from the power off indicating apparatus 100 when resetting the display status (e.g., resetting the display image to be a white image) of the electrophoretic display 102 in order to use the additional power to reset the electrophoretic display 102, the power off indicating apparatus 100 of the embodiment may use the tag reader 106 to reset the electrophoretic display 102, that is, the tag reader 106 is used to supply the power required for resetting the electrophoretic display 102 without disassembling the electrophoretic display 102, thereby effectively improving convenience of utilization. The tag reader 106 may be used to read an electronic tag, and the electronic tag may be, for example, a radio frequency identification (RFID) tag or a near field communication (NFC) tag and so on, which should not be construed as a limitation to the invention. The electronic tag may, for example, record user information, a command (e.g., resetting command) and so on. The tag reader 106 may reset the display status of the electrophoretic display 102 according to the information read by the electronic tag.

Furthermore, in the condition that the electronic tag is realized as the RFID tag, the tag reader 106 may include an RFID chip (not shown). In the condition that the electronic tag is realized as the NFC tag, the tag reader 106 include an NFC chip (not shown). Alternatively, the tag reader 106 may include a chip which is an integrated via the RFID chip and the NFC chip so that the tag reader 106 not only can read the RFID tag but also can read the NFC tag. In the meantime, the tag reader 106 may further, for example, include a micro controller (not shown), which can control the electrophoretic display 102 to reset the display image according to the information (e.g., reset command) read by the RFID chip or the NFC chip. In this manner, using the electronic tag read by the tag reader 106 to reset the display status of the electrophoretic display 102 not only can improve the convenience of utilization, but also can achieve the encryption protection effect.

Figure 2:
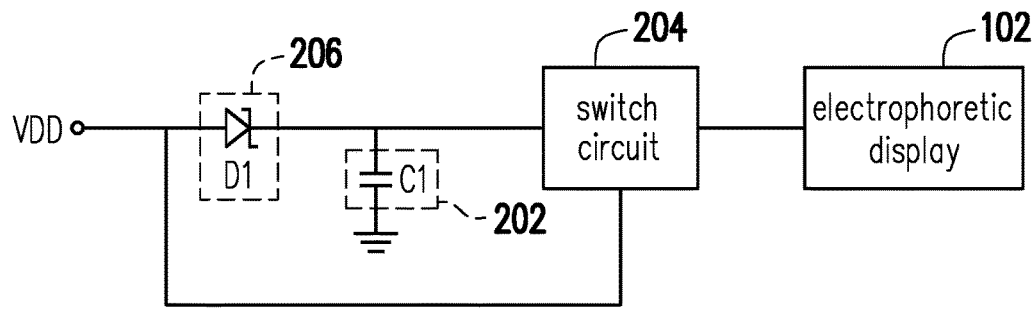
FIG. 2 is a schematic view of a power off detecting circuit according to an embodiment of the invention.

FIG. 2 is a schematic view of a power off detecting circuit according to an embodiment of the invention. Referring to FIG. 2, specifically, the implementation method of the power off detecting circuit may be as illustrated in FIG. 2, the power off detecting circuit may, for example, include an electricity storage element 202, a switch circuit 204 and a rectifying circuit 206. The rectifying circuit 206 is coupled between a power VDD and a switch circuit 204, such that the current that flows through the rectifying circuit 206 flows unidirectionally from one end of the power VDD to one end of the electricity storage element 202. In the embodiment, the rectifying circuit 206 is implemented as a diode D1, which should not be construed as a limitation to the invention. A first end of the electricity storage element 202 is coupled to the rectifying circuit 206, and a second end of the electricity storage element 202 is coupled to the ground. The electricity storage element 202 may be, for example, implemented as a capacitor C 1 of the embodiment, which should not be construed as a limitation to the invention. The capacitor C 1 may be, for example, a super capacitor or an electrical double-layer capacitor (EDLC). In addition, the switch circuit 204 is coupled between the rectifying circuit 206 and the electrophoretic display 102, and the on status thereof is subjected to the power voltage of the power VDD. For example, when the power voltage is supplied by the power VDD, the power VDD may charge the electricity storage element 202. When power voltage is not supplied (power off status), the electricity that is previously stored in the electricity storage element 202 is released, such that a storage voltage VC can be supplied to the electrophoretic display 102 via the switch circuit 204 so as for the electrophoretic display 102 to display power off information. Since the display content can be maintained without requiring the electrophoretic display 102 to supply power continuously, it can be effectively indicated whether the power VDD was off, and the problem of continuing power supply does not exist.

Figure 3:
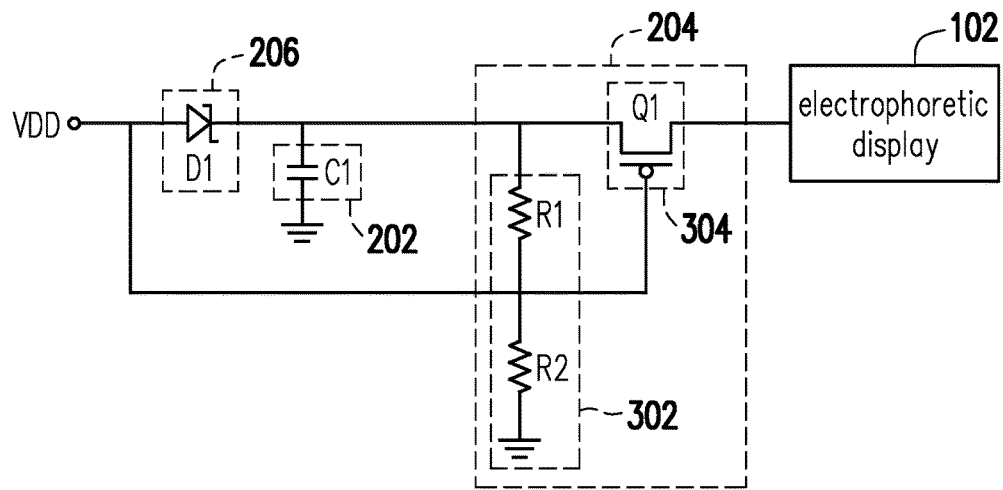
FIG. 3 is a schematic view of a power off detecting circuit according to another embodiment of the invention.

FIG. 3 is a schematic view of a power off detecting circuit according to another embodiment of the invention. Referring to FIG. 3, in the embodiment, the switch circuit 204 may include a dividing circuit 302 and a switch 304. The dividing circuit 302 is coupled between the power VDD and a control end of the switch 304. The switch 304 is further coupled between the rectifying circuit 206 and the electrophoretic display 102. In the embodiment, the dividing circuit 302 may, for example, include a resistor R1 and a resistor R2, and the switch 304 may be implemented as a p-type transistor Q1, which should not be construed as a limitation to the invention. The resistor R1 and the resistor R2 are connected in series between a first end of the electricity storage element 202 and the ground, and a common contact point of the resistor R1 and the resistor R2 is coupled to the power VDD and the control end of the switch 204. The dividing circuit 302 may divide the power voltage supplied by the power VDD to supply the dividing voltage to the control end of the switch 204. Specifically, when the power voltage supplied by the power VDD is not lower than a threshold voltage (i.e., power supply status), the dividing voltage supplied via the common contact point of the resistor R1 and the resistor R2 allows the p-type transistor Q1 to be in an off status. At this point, the power VDD charges the electricity storage element 202 via the rectifying circuit 206. When the power voltage supplied by the power VDD is lower than the threshold voltage, (e.g., power off status), the dividing voltage supplied by the common contact point of the resistor R1 and the resistor R2 allows the p-type transistor Q1 to be in the on status. At this point, the electrophoretic display 102 may be driven by the storage voltage supplied by the electricity storage element 202 so as for the electrophoretic display 102 to display power off information. It should be mentioned that, in some part of the embodiment, the power off detecting circuit of the embodiment may not include the rectifying circuit 206. In other words, the first end of the electricity storage element 202 and the switch circuit 204 may be coupled to the power VDD without the rectifying circuit 206.

Figure 4:
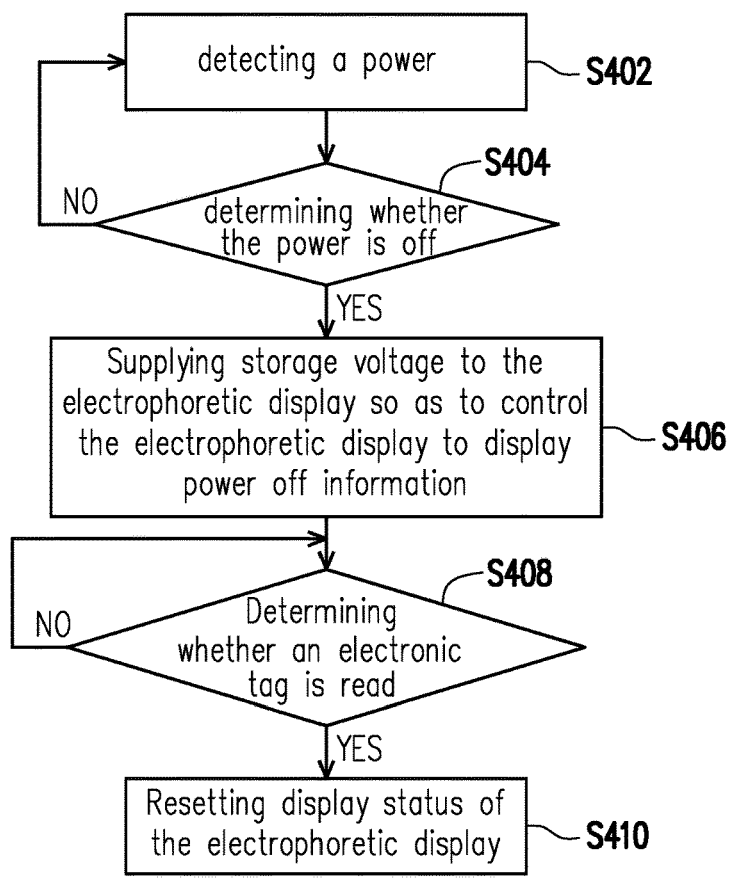
FIG. 4 is a flowchart of a power off indicating method of a power off indicating apparatus according to an embodiment of the invention.

FIG. 4 is a flowchart of a power off indicating method of a power off indicating apparatus according to an embodiment of the invention. Referring to FIG. 4, the above-mentioned embodiment shows that the power off indicating method of the power off indicating apparatus may at least include the following steps. First of all, power is detected (step S402). Next, it is determined whether the power is off (step S404). When the power is off, a storage voltage is supplied to an electrophoretic display so as to control the electrophoretic display to display a power off information (step S406). On the other hand, if the power is not off, the step S402 is carried out again to detect the power continuously. In addition, after the step S406 is carried out, it may be determined subsequently whether an electronic tag is read (step S408). When the electronic tag is read, a display status of the electrophoretic display may be reset (step S410), such that the power off indicating apparatus can continuously detect the power supply status of the power. In this manner, the convenience of utilization of the power off indicating apparatus can be improved, and the encryption protection effect can be achieved. On the other hand, if the electronic tag is not read, then the step S408 is carried out again to continuously determine whether the electronic tag is read.

In summary, the power off detecting circuit in the embodiment of the invention may supply the storage voltage to the electrophoretic display when the power is off, so as to control the electrophoretic display to display power off information. Since the display content can be maintained without requiring the electrophoretic display to supply power continuously, it can be effectively indicated whether the power was off, and the problem of continuing power supply does not exist. In addition, using the electronic tag read by the tag reader to reset the display status of the electrophoretic display not only can improve convenience of utilization but also can achieve the encryption protection effect.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:
1. A power off indicating apparatus, comprising:
an electrophoretic display;
a power off detecting circuit, coupled to the electrophoretic display, the power off detecting circuit detecting a power, and supplying a storage voltage to the electrophoretic display when a power voltage supplied by the power is lower than a threshold voltage, so as to control the electrophoretic display to display a power off information; and
a tag reader, coupled to the electrophoretic display, the tag reader reading an electronic tag to reset a display status of the electrophoretic display.

2. The power off indicating apparatus according to claim 1, wherein the power off detecting circuit comprises:
an electricity storage element, a first end of the electricity storage element coupled to the power, a second end of the electricity storage element being connected to a ground; and
a switch circuit, coupled between the power and the electrophoretic display, when the power voltage supplied by the power is not lower than the threshold voltage, the power charging the electricity storage element, when the power voltage is lower than the threshold voltage, the storage voltage stored in the electricity storage element being supplied to the electrophoretic display.

3. The power off indicating apparatus according to claim 2, wherein the switch circuit comprises:
a dividing circuit, coupled to the power, the dividing circuit dividing the power voltage to supply a dividing voltage; and
a switch, coupled between the power and the electrophoretic display, a control end of the switch receiving the dividing voltage.

4. The power off indicating apparatus according to claim 3, wherein the dividing circuit comprises:
a first resistor; and
a second resistor, connected with the first resistor in series between a first end of the electricity storage element and the ground, a common contact point of the first resistor and the second resistor being coupled to the power and a control end of the switch.

5. The power off indicating apparatus according to claim 3, wherein the switch comprises a p-type transistor.

6. The power off indicating apparatus according to claim 2, wherein the power off detecting circuit comprises:
a rectifying circuit, coupled to the source, the switch circuit and the electricity storage element.

7. The power off indicating apparatus according to claim 2, wherein the electronic tag comprises a near field communication tag, and the reader comprises a near field communication reader.

8. A power off indicating method of a power off indicating apparatus, the power off indicating apparatus comprising an electrophoretic display, the power off indicating method of the power off indicating apparatus comprising:
detecting a power;
if the power is not turned off, continuing to detect the power;
determining whether a power voltage supplied by the power is lower than a threshold voltage;
when the power voltage supplied by the power is lower than the threshold voltage, providing a storage voltage to the electrophoretic display so as to control the electrophoretic display to display a power off information;
determining whether an electronic tag is read;
if the electronic tag is not read, continuing to determine the electronic tag; and
if the electronic tag is read, resetting a display status of the electrophoretic display.

9. The power off indicating method of the power off indicating apparatus according to claim 8, wherein the electronic tag comprises a near field communication tag, and the reader comprises a near field communication reader.

10. The power off indicating method of the power off indicating apparatus according to claim 8, wherein if the power is not off, an electricity storage element in the power off indicating apparatus is charged, and the electricity storage element is charged to provide the storage voltage.

\* \* \* \* \*